(12) United States Patent
Yang

(10) Patent No.: US 6,427,660 B1
(45) Date of Patent: Aug. 6, 2002

(54) DUAL FUEL COMPRESSION IGNITION ENGINE

(75) Inventor: Jialin Yang, Canton, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/620,147

(22) Filed: Jul. 20, 2000

(51) Int. Cl.[7] .............................................. F02M 43/00

(52) U.S. Cl. .................... 123/304; 123/276 G; 123/526; 123/531

(58) Field of Search .............................. 123/276 G, 304, 123/526, 299, 531

(56) References Cited

U.S. PATENT DOCUMENTS

| | | |
|---|---|---|
| 3,659,415 A | 5/1972 | Brenneke |
| 4,637,353 A | 1/1987 | Codrington |
| 4,794,901 A | 1/1989 | Hong et al. |
| 5,207,204 A | 5/1993 | Kawachi et al. |
| 5,228,423 A | 7/1993 | Oikawa et al. |
| 5,365,902 A * | 11/1994 | Hsu .............................. 123/299 |
| 5,592,924 A | 1/1997 | Audisio et al. |
| 5,996,558 A * | 12/1999 | Ouellette et al. ........... 123/506 |

FOREIGN PATENT DOCUMENTS

GB            1370619            10/1974

* cited by examiner

Primary Examiner—Tony M. Argenbright
Assistant Examiner—Katrina B. Harris
(74) Attorney, Agent, or Firm—Carlos Hanze

(57) ABSTRACT

A compression ignition internal combustion engine 7 is provided. The engine has at least one combustion chamber 10 having an air inlet 14 and an exhaust outlet 26. A dual fuel injector is provided having a mixing chamber 46 with an outlet fluidly connected with the combustion chamber 10 via a first valve 54. A liquid fuel line 64 is provided for delivering liquid fuel to the mixing chamber 46. The liquid fuel line 64 is connected to the mixing chamber 46 via a second valve 60. A combustible gas line 56 is provided for delivering compressed combustible gas to the mixing chamber 46. Upon an opening of the first valve 54, the liquid fuel is brought into the combustion chamber 10 by the compressed combustible gas.

23 Claims, 2 Drawing Sheets

DUAL FUEL COMPRESSION IGNITION ENGINE

FIELD OF THE INVENTION

The field of the invention is that of dual fuel powered compression ignition internal combustion engines. More particularly, the field of the present invention is that of a diesel engine which can alternatively or simultaneously be powered by compressed natural gas and a petroleum or non petroleum liquid diesel fuel.

BACKGROUND OF THE INVENTION

To help clean up the environment, great strides have been made in reducing the exhaust emissions of automotive vehicle engines. In a further attempt to lower vehicle engine emissions, the use of alternative fuels has been explored. An excellent example of such a fuel is compressed natural gas (CNG). There has been much progress in lowering emissions by using CNG, most notably in spark-ignited internal combustion engines.

It is desirable to extend the use of CNG to compression ignition engines such as diesel engines. However, CNG typically must be compressed to far higher pressures than what typically occur in a compression cycle of a conventional diesel engine before the CNG will auto-ignite. Additionally, it is very hard to disperse a gas within a compression chamber under pressurized conditions. Liquids are easier to inject into a pressurized combustion chamber to achieve disbursal of the fuel within the combustion chamber. Accordingly, to utilize CNG, a small amount of diesel fuel is typically added which auto-ignites at the conventional diesel compression pressure. The ignited diesel fuel generates a temperature spike within the combustion chamber which causes the CNG to ignite.

Prior to the present invention, there have been various inventions to allow the use of CNG in diesel engines. One such invention has a coaxial injection of CNG and diesel fuel into the cylinder combustion chamber of the engine. However, the injector utilized for the coaxial injection is technically complex. Furthermore, injectors, which have been brought forth previously for coaxial injection of CNG and diesel fuel, have been very expensive.

It is desirable to provide a diesel engine that can be powered by a mixture of CNG and liquid diesel fuel. It is also desirable to provide a multi-fuel diesel engine which has a less complex design for its injector units. It is furthermore desirable to provide a multi-fuel diesel engine as described wherein the injectors are less expensive than those previously provided.

SUMMARY OF THE INVENTION

To make manifest the above delineated and other desires, the revelation of the present invention is brought forth. The present invention provides a CNG/diesel liquid fuel internal combustion engine that uses CNG to bring the diesel fuel out of a dual fuel injector. The dual fuel injector has a mixing chamber with an outlet fluidly connected with the combustion chamber via a first valve. A liquid fuel line is provided for delivering liquid fuel to the mixing chamber. The liquid fuel line is connected to the mixing chamber via a second valve. A combustible gas delivery line is also connected with the mixing chamber to deliver compressed combustible gas thereto. In operation, the second valve is opened to inject pressurized liquid fuel into the mixing chamber. Subsequently, the first valve is opened to allow the CNG to bring the diesel fuel into the combustion chamber.

Accordingly, mechanical power from the engine is needed only for a low pressure diesel fuel (feed) pump (<50 bar), in contrast to a high pressure fuel pump (>200 bar, up to a few thousand bar) for a conventional diesel engine. Due to the lower power requirement for driving the diesel fuel pump, fuel economy of the engine is improved. The lower pressure diesel fuel pump is also less expensive than the prior required high-pressure diesel fuel feed pump.

It is a feature of the present invention to provide a dual fuel compression ignition diesel engine. It is also a feature of the present invention to provide a dual fuel internal combustion diesel engine which does not require a high-pressure pump for the diesel fuel.

The above-noted features of the present invention will become apparent to those skilled in the art from a review of the invention as it is provided in the accompanying drawings and detailed description.

DETAILED DESCRIPTION OF THE INVENTION

Figure 1:
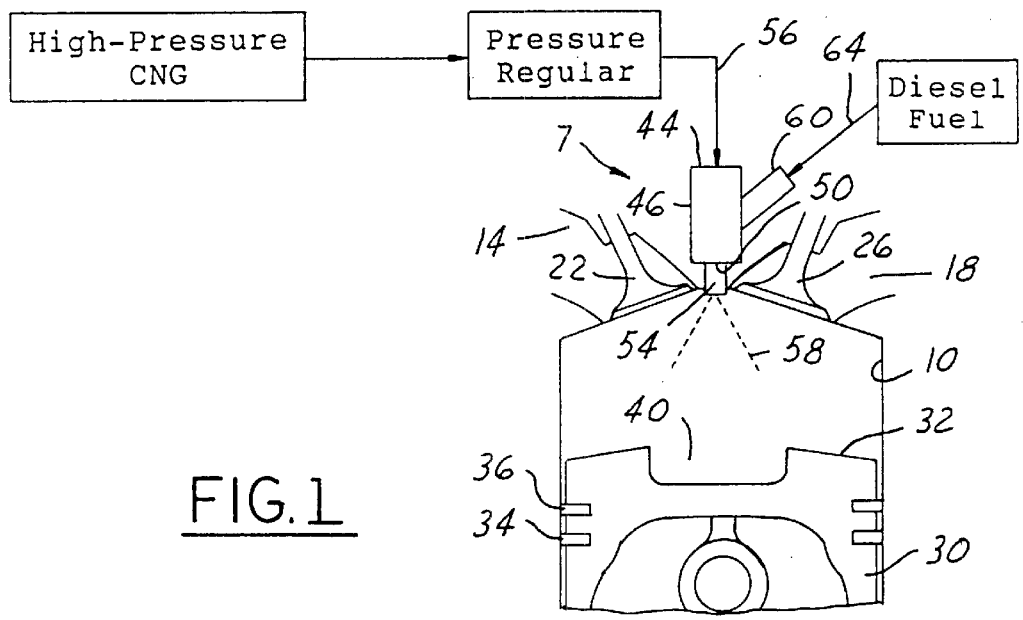
FIG. 1 is a schematic view of a preferred embodiment compression ignition internal combustion engine of the present invention.

FIG. 1 illustrates a compression ignition internal combustion engine 7 according to the present invention. Compression ignition internal combustion engines are commonly referred to as diesel engines. The engine 7 has at least one and typically a plurality of cylindrical combustion chambers 10. The combustion chamber 10 has an air inlet 14 and an exhaust outlet 18. Controlling flow through the air inlet 14 is an inlet valve 22. Controlling flow through the exhaust outlet 18 is an outlet valve 26. Slidably mounted within the combustion chamber 10 is a reciprocating piston 30. The piston 30 has a head 32 that is sealed within the combustion chamber 10 by seal rings 34 and 36. The piston head 32 also has a depression 40 to induce swirl.

The engine 7 has a dual fuel injector 44. The dual fuel injector 44 has a mixing chamber 46. The mixing chamber 46 has an outlet 50 that is fluidly connected with the combustion chamber 10 via a first valve 54. The first valve 54 is provided for metered atomized delivery of the contents of the mixing chamber 46 into the combustion chamber 10. The first valve 54 is typically solenoid actuated and is similar to an air forced gasoline fuel injector.

A source of high pressure compressed natural gas (CNG) is provided as one of the fuels for the engine 7. The original pressure of the CNG can be up to a few hundred bars. A pressure regulator is provided to keep the CNG pressure between fifteen and forty-five bars (preferably between fifteen and thirty bars) in a compressed combustible gas delivery line 56. Accordingly, the pressure within the mixing chamber 46 equals the pressure in the compressed combustible gas delivery line 56.

A second valve 60 is fluidly connected with the mixing chamber 46. The second valve 60 is typically a solenoid actuated valve. The second valve 60 is also fluidly connected with a source of pressurized liquid fuel product. The pressurized liquid fuel product is typically a diesel fuel which has been pressurized by a low pressure feed pump. The pressure of the diesel fuel in the diesel fuel line 64 will typically be in a relatively stable range of thirty to fifty bars.

The pressure of the diesel fuel in the diesel fuel delivery line 64 is typically selected to always be greater than the pressure of the CNG in the CNG delivery line 56. The control of the second valve 60 will typically be electric pulse width modulation. In similar fashion, the control of the first valve 54 will also be pulse width modulation.

In operation, from a top dead-center position, the inlet valve 22 is opened allowing air to be drawn into the combustion chamber 10 as the piston 30 is lowered. The exhaust valve 26 remains closed. At or slightly before bottom dead center, the inlet valve 22 is closed. The piston 30 is then brought upwards to compress the air above the cylinder head 32. As previously mentioned, the control of the compressed natural gas is conducted by the opening and closing of the first valve 54. Accordingly, the mixing chamber 46 will normally be filled with the CNG delivered by the delivery line 56. Liquid diesel fuel is delivered in a metered fashion into the mixing chamber 46 by the second valve 60. The diesel fuel can enter the mixing chamber 46 due to its higher pressure. After the entry of diesel fuel into the mixing chamber 46, the first valve 54 is opened to deliver the CNG and diesel fuel into the combustion chamber 10 in a flow stream 58. Upon further compression of the combustion chamber by the piston 30, the diesel fuel burns first by auto ignition and then the high temperature flame ignites the CNG. At high engine load operational conditions, split injection should be used. The first or initial injection occurs during the intake stroke of the piston 30. The first injection is made with CNG only. Accordingly, the first valve 54 will be opened. A second injection is made as previously described during the compression stroke of the combined CNG and diesel fuel. If the load upon engine 7 should decrease, the injection pulse width of the first CNG injection will be shorted to reduce the total amount of CNG. The initial injection of CNG will also be retarded to reduce the homogeneity of the fuel within the combustion chamber 10. At even lighter loads, the first injection of CNG only can be eliminated. Accordingly, a single injection during the compression stroke at light loads results in a stratified fuel distribution within the combustion chamber 10. Stratified fuel distribution promotes a fast burn. The fuel mass ratio of CNG to diesel fuel will depend upon operating conditions. In general, the variation of diesel fuel mass per cycle will typically be small. The change in engine load is realized mainly be changing the injected CNG mass per cycle. At full engine loads it is desirable to control the diesel fuel mass to be less than five percent of the total fuels. The ratio between diesel fuel and CNG will increase as the load upon engine 7 decreases.

Figure 2:
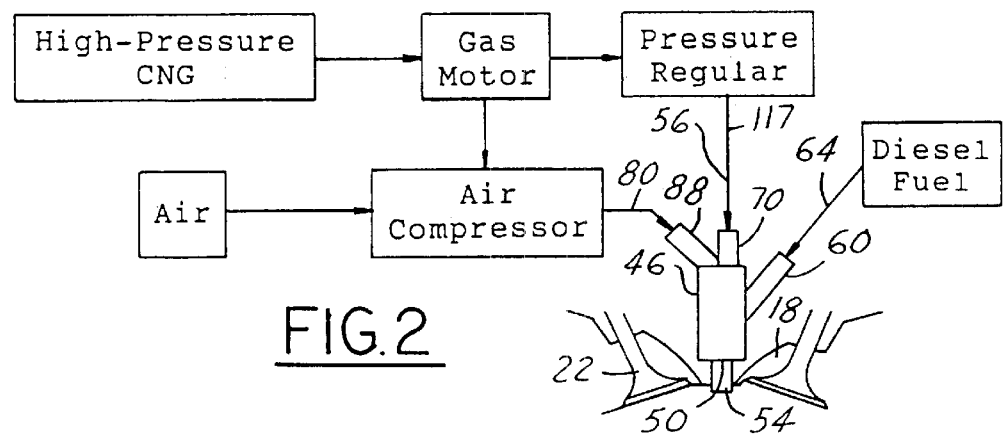
FIGS. 2–4 are views similar to that of FIG. 1 illustrating alternate preferred embodiments of the present invention.

Referring to FIG. 2 with like items being given similar reference numerals, an alternative diesel engine 117 according to the present invention additionally has compressed air injection. The engine 117 has a source of CNG as previously described. Between the source of CNG and the pressure regulator there is a gas motor. The gas motor utilizes the pressure in the CNG to power an air compressor. The air compressor is connected into a compressed air delivery line 80. The engine 117 has a first valve 54 as previously described. The engine 117 has a third valve 70 which is typically solenoid actuated which controls the flow of CNG between CNG delivery line 56 and the mixing chamber 46. Fluidly connected with the mixing chamber 46 is a fourth valve 88 to meter the amount of compressed air delivered to the mixing chamber 46. If desired, the air compressor can be connected with an accumulator or compressed air storage bottle (not shown). The engine 117 will operate in a similar fashion as aforedescribed for the engine 7 for multiple injections. The initial injection of CNG during the intake stroke is made by opening the first valve 54 and the third valve 70. For the second injection, the second valve 60 will allow delivery of pressurized diesel fuel. The fourth valve 88 will be selectively energized to allow for delivery of compressed air into the mixing chamber 46 to bring out the diesel fuel into the combustion chamber 10. Bringing out the diesel fuel with the compressed air will eliminate the fuel rich region that may be created by the second aforementioned fuel injection at full engine load.

Figure 3:
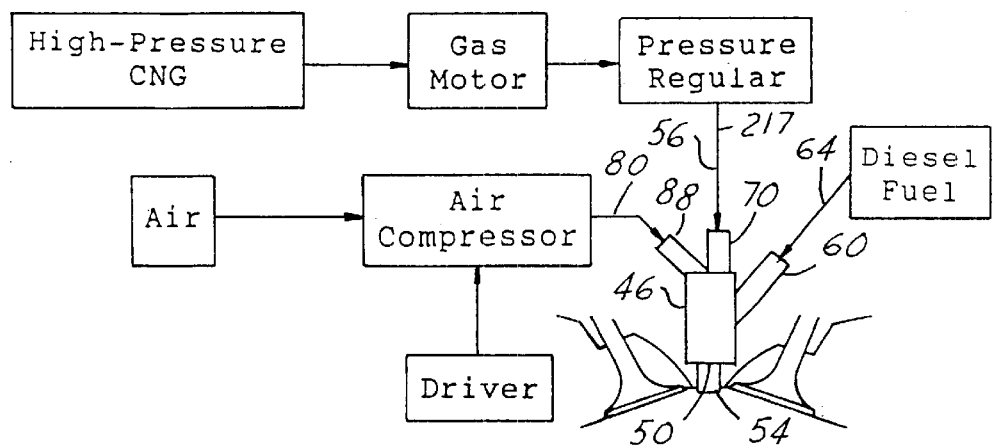

Referring to FIG. 3, the compression ignition internal combustion engine 217 functions in a manner essentially as described with regard to the engine 117, with the exception that a separate driver, typically the engine 217 itself, is used to drive the air compressor.

Figure 4:
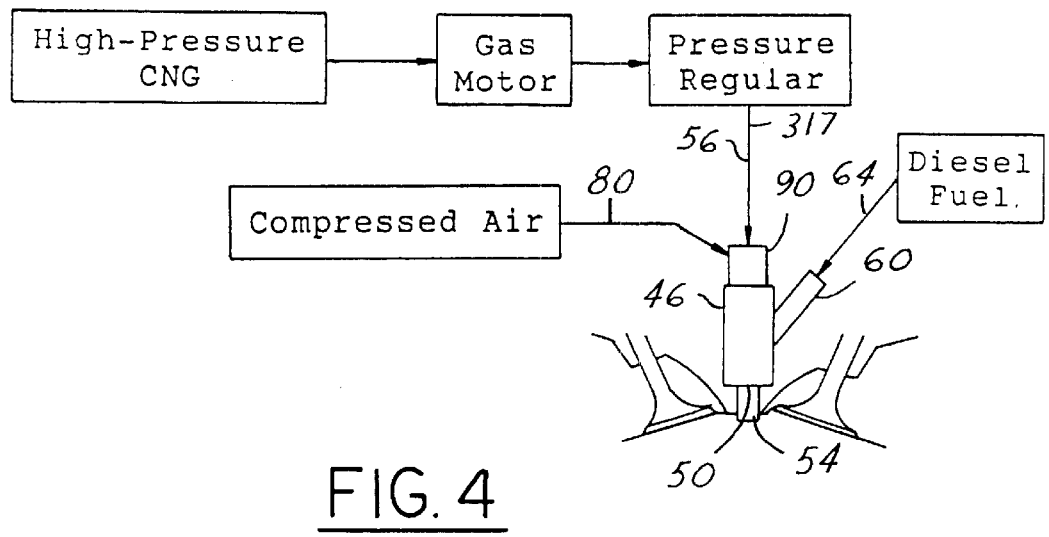

FIG. 4 illustrates an embodiment of the present invention wherein the compressed air is supplied by a compressor or accumulator (not shown). The third valve 70 and fourth valve 88 have been replaced by a three-way valve 90 which can be alternatively switched to connect the mixing chamber 46 with the source of compressed air or with a source of CNG.

The engines 117, 217 and 317 can also be switched to function in a manner to bring out the diesel fuel with the CNG as desired by engine operational parameters. All of the engines 7, 117, 217 and 317 may have an added second high pressure diesel fuel injector to allow the combustion chamber 10 to be alternatively powered as a standard diesel engine or powered as a combined fuel CNG/diesel fuel engine.

The present invention compression ignition engine and methods of operation thereof have been shown in several embodiments. However, it is apparent to those skilled in the art that various modifications can be made to the present invention without departing from the spirit or scope of the present invention as it is encompassed in the specification and drawings and by the following claims.

I claim:

1. A compression ignition internal combustion engine comprising:
   at least one combustion chamber having an air inlet and an exhaust outlet;
   a reciprocating piston slidably mounted within said combustion chamber;
   a dual fuel injector having a mixing chamber with an outlet fluidly connected with said combustion chamber via a first valve;
   a liquid fuel line delivering liquid fuel to said mixing chamber, said liquid fuel line being connected to said mixing chamber via a second valve; and
   a combustible gas line for delivering compressed combustible gas to said mixing chamber to bring said liquid fuel into said combustion chamber upon an opening of said first valve.

2. A compression ignition internal combustion engine as described in claim 1, wherein said combustible gas is compressed natural gas.

3. A compression ignition internal combustion engine as described in claim 1, wherein said liquid fuel is a diesel fuel.

4. A compression ignition internal combustion engine as described in claim 1, wherein there is a pressure regulator which controls the pressure of said combustible gas delivered to said mixing chamber.

5. A compression ignition internal combustion engine as described in claim 1, wherein said pressure of said combustible gas delivered to said mixing chamber is between 15 and 45 bar.

6. A compression ignition internal combustion engine as described in claim 1, wherein said liquid fuel is delivered to said mixing chamber at a pressure under 50 bar.

7. A compression ignition internal combustion engine as described in claim 1, wherein said liquid fuel is delivered to said mixing chamber at a higher pressure than a pressure of said combustible gas when said combustible gas is delivered to said mixing chamber.

8. A compression ignition internal combustion engine comprising:
- at least one combustion chamber having an air inlet and an exhaust outlet;
- a reciprocating piston slidably mounted within said combustion chamber;
- a dual fuel injector having a mixing chamber with an outlet fluidly connected with said combustion chamber via a first valve;
- a diesel fuel line for delivering diesel fuel to said mixing chamber at a first pressure via a second valve;
- a compressed combustible gas line for delivering compressed natural gas to said mixing chamber, said compressed natural gas bringing out said diesel fuel into said combustion chamber upon opening of said first valve; and
- a pressure regulator for regulating the pressure of said compressed natural gas delivered to said mixing chamber to a pressure lower than said first pressure.

9. A method of operating a compression ignition internal combustion engine having at least a first combustion chamber with an air inlet and air outlet and said combustion chamber having a slidably mounted reciprocating piston, said engine also having a dual fuel injector with a mixing chamber with an outlet connected with said combustion chamber via a first valve, said mixing chamber being connected with a source of compressed combustible gas and said mixing chamber being connected via a second valve with a source of pressurized liquid fuel, said method comprising:
- opening said second valve to deliver liquid fuel into said mixing chamber; and
- opening said first valve to allow said compressed combustible gas to bring out said liquid fuel into said combustion chamber.

10. A method of operating a compression ignition internal combustion engine as described in claim 9, wherein said compressed combustible gas bringing out said liquid fuel is compressed natural gas.

11. A method of operating a compression ignition internal combustion engine as described in claim 9, wherein said liquid fuel delivered into said mixing chamber is a diesel fuel.

12. A method of operating a compression ignition internal combustion engine as described in claim 9, having multiple injections into said combustion chamber wherein a separate initial injection of combustible gas is made into said mixing chamber by opening said first valve before said opening of said second valve to deliver liquid fuel into said mixing chamber.

13. A method of operating a compression ignition internal combustion engine as described in claim 12, wherein said separate initial injection of combustible gas into said combustion chamber is during an intake stroke of said piston.

14. A method of operating a compression ignition internal combustion engine as described in claim 13, wherein said separate initial injection of combustible gas into said combustion chamber can be selectively retarded based upon an operational condition of said engine.

15. A method of operating a compression ignition internal combustion engine as described in claim 14, wherein said engine operational condition is a load on said engine.

16. A method of operating a compression ignition internal combustion engine as described in claim 9, wherein said liquid fuel is delivered into said mixing chamber at a higher pressure than a pressure of said compressed natural gas.

17. A method of operating a compression ignition internal combustion engine as described in claim 16, wherein said pressure of said liquid fuel is under 50 bar.

18. A compression ignition internal combustion engine comprising:
- at least one combustion chamber having an air inlet and an exhaust outlet;
- a reciprocating piston slidably mounted within said combustion chamber;
- a dual fuel injector having a mixing chamber with an outlet fluidly connected with said combustion chamber;
- a first valve for releasing into said combustion chamber contents of said mixing chamber;
- a second valve for delivering a liquid fuel to said mixing chamber;
- a third valve for delivering a compressed combustible gas to said mixing chamber; and
- a fourth valve for delivering compressed air to said mixing chamber.

19. A compression ignition internal combustion engine as described in claim 18, wherein said compressed combustible gas powers an air compressor supplying compressed air to said third valve.

20. A compression ignition internal combustion engine as described in claim 18, wherein said third and fourth valves are provided by a three-way valve that alternatively connects said mixing chamber with said compressed combustible gas or said compressed air.

21. A method of operating a compression ignition internal combustion engine having at least a first combustion chamber with an air inlet and an air outlet, and said combustion chamber having a slidably mounted reciprocating piston, said engine also having a dual fuel injector with a mixing chamber with an outlet connected with said combustion chamber via a first valve, said mixing chamber being connected via a second valve with a source of pressurized liquid fuel, said mixing chamber also being connected with a source of compressed combustible gas via a third valve, said mixing chamber also being connected with a source of compressed air by a fourth valve, said operating method comprising:
- opening said first and third valves to deliver compressed combustible gas to said combustion chamber;
- opening said second valve to deliver liquid fuel to said mixing chamber;
- opening said fourth and second valves to deliver compressed air into said mixing chamber to bring said liquid fuel into said combustion chamber.

22. A method of operating a compression ignition internal combustion engine as described in claim 21, wherein said delivery of said combustible gas into said mixing chamber is performed during an intake stroke of said piston.

23. A method of operating a compression ignition internal combustion engine as described in claim 21, wherein said timing of the delivery of said combustible gas is based upon a load of said engine to achieve a stratified charge within said combustion cylinder.

* * * * *